UNITED STATES PATENT OFFICE.

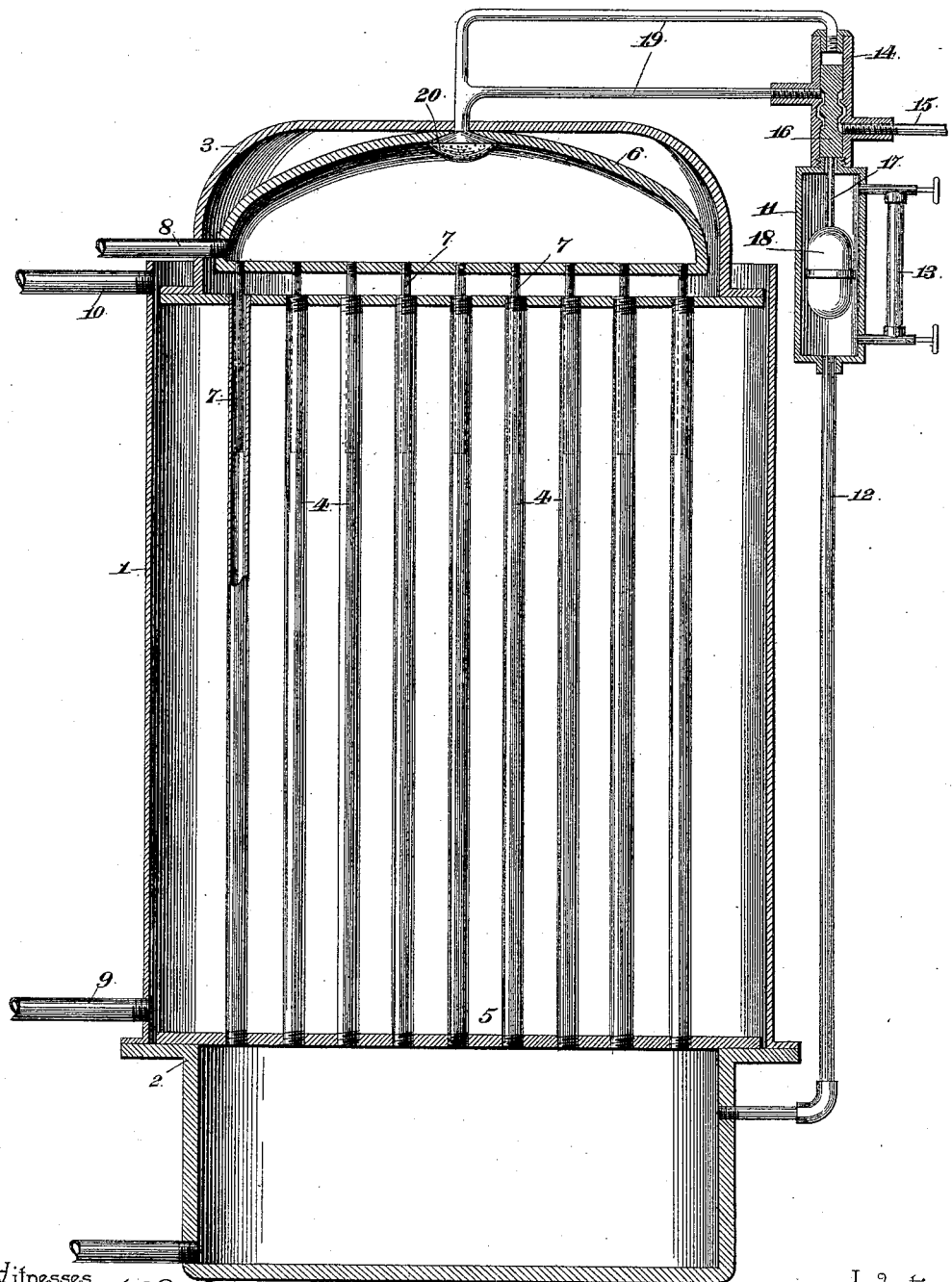

FREDRICK KAISER, OF KNOXVILLE, TENNESSEE.

AMMONIA-ABSORBER.

SPECIFICATION forming part of Letters Patent No. 452,273, dated May 12, 1891.

Application filed October 4, 1890. Serial No. 367,070. (No model.)

*To all whom it may concern:*

Be it known that I, FREDRICK KAISER, a citizen of the United States, residing at Knoxville, in the county of Knoxville and State of Tennessee, have invented a new and useful Ammonia-Absorber, of which the following is a specification.

This invention relates to an improved absorber to be used in connection with ammonia-absorption ice-machines; and it has for its object to construct a device of this class which shall be simple, durable, and effective in operation.

With these ends in view the invention consists in the improved construction, arrangement, and combination of parts which will be hereinafter fully described, and particularly pointed out in the claims.

In the drawing hereto annexed, the figure is a vertical sectional view of an ammonia-absorber containing my improvements.

Like numerals of reference indicate like parts in the figure.

A tank or vessel 1, which forms the casing of my improved absorber, is mounted upon a base 2, which forms a receptacle for the aqua-ammonia.

3 designates a dome or chamber, which is provided with downwardly-extending pipes 4, the lower ends of which are extended through the bottom 5 of the tank 1.

Within the dome or chamber 3 is arranged a chamber or casing 6, having a series of downwardly-extending pipes 7, which are extended into the upper ends of the pipes 4. The inner chamber or compartment 6 is connected with an inlet-pipe 8, through which anhydrous ammonia-gas is supplied. The lower and upper ends, respectively, of the tank 1 are provided with pipes for the admission and escape of cooling-water, as shown at 9 and 10.

11 designates a tank or casing arranged adjacent to the upper end of the tank 1 and having its lower end connected by a circulating-pipe 12 with the ammonia-reservoir 2. The tank or casing 11 has a gage-glass 13, through which the state of its contents may be observed. The upper end of the tank 11 has a valve-casing 14, which is connected by a pipe 15 with a suitable source of supply of a weak solution of ammonia. In the casing 14 is mounted a valve 16, which is connected by a stem 17 with a float 18 in the tank 11. Pipes 19 connect the valve-casing 14 with the chamber 6, in which is arranged a rose or spray 20 for the admission of weak ammonia through the pipes 19.

In operation the anhydrous ammonia-gas is admitted through the pipe 8 to the chamber 6, and is there mingled with the weak solution of ammonia which is supplied through the spray 20. The admission of the weak solution of ammonia is automatically regulated by the balanced valve 16, which is operated by the float 18 in the casing 11. Cold water is admitted through the pipe 9 at the bottom of tank 1 and is permitted to escape through the pipe 10 at the upper end of said tank. The mixture of anhydrous and weak ammonia which passes downwardly through the pipes 7 and 4 is thus brought in contact with an extensive condensing-surface, causing the anhydrous ammonia-gas to be perfectly absorbed by the weak solution.

Having thus described my invention, what I claim, and desire to secure by Letters Patent of the United States, is—

1. In an ammonia-absorber, the combination of the tank mounted upon a suitable receiving-vessel, a top chamber having downwardly-extending pipes connected with the said receiving-chamber, and a vessel or compartment arranged within the said top compartment and having pipes extended into the upper ends of the pipes, connecting the latter with the bottom compartment or receptacle, substantially as set forth.

2. In an ammonia-absorber, the combination of a tank or vessel mounted upon a suitable receiver, a top chamber or compartment connected by vertical pipes with the top of said receiver, a chamber arranged within the said top compartment and having pipes extended into the vertical pipe of the latter, pipes for the admission and escape of water to and from the main tank, means for supplying anhydrous ammonia-gas to the interiorly-arranged top casing, and mechanism for supplying a weak solution of ammonia in regulated quantities to the said top casing, substantially as set forth.

3. In an ammonia-absorber, the combination of a tank or casing mounted upon a suitable receiver, a top vessel or chamber connected with said receiver by vertically-arranged pipes, a supplemental vessel arranged within the said top compartment and having pipes extended into the upper ends of the pipes of the main tank, a tank or casing having a float operating a balanced valve, which regulates the supply of ammonia solution into the inner or supplemental top casing, and pipes connecting the said valve-casing with the supplemental top casing, with the bottom receiving-vessel, and with a source of supply, substantially as set forth.

In testimony that I claim the foregoing as my own I have hereto affixed my signature in presence of two witnesses.

FREDRICK KAISER.

Witnesses:
J. B. SCHWARS,
P. J. MCCARTHY.